(12) United States Patent
Hadinger

(10) Patent No.: US 8,594,662 B2
(45) Date of Patent: Nov. 26, 2013

(54) METHOD AND APPARATUS FOR PROTECTED COMMUNICATIONS TO HIGH ALTITUDE AIRCRAFT

(75) Inventor: Peter J. Hadinger, Oakton, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 352 days.

(21) Appl. No.: 13/020,524

(22) Filed: Feb. 3, 2011

(65) Prior Publication Data

US 2012/0200454 A1 Aug. 9, 2012

(51) Int. Cl.
*H04W 4/00* (2009.01)

(52) U.S. Cl.
USPC ......... 455/431; 455/427; 455/12.1; 455/13.2; 455/62; 455/63.2

(58) Field of Classification Search
USPC ................ 455/12.1, 13.1, 11.1, 67.16, 552.1, 455/115.1, 99, 106, 152.1, 297, 427, 429, 455/428, 430, 431, 296, 13.3, 13.2; 702/3; 343/700, 846, 909; 342/346, 357.12, 342/383, 351, 45, 42, 43, 44, 46, 47, 51, 342/356, 354, 352, 357; 370/316, 319, 466, 370/342, 431, 456, 121, 310
See application file for complete search history.

(56) References Cited

U.S. PATENT DOCUMENTS

| | | | | |
|---|---|---|---|---|
| 3,750,175 A * | 7/1973 | Lockerd et al. | ............... | 342/371 |
| 4,797,677 A * | 1/1989 | MacDoran et al. | ........... | 342/352 |
| 5,526,676 A * | 6/1996 | Solheim et al. | ............. | 73/29.01 |
| 5,724,043 A * | 3/1998 | Savage et al. | ................ | 342/351 |
| 5,739,786 A * | 4/1998 | Greenspan et al. | ...... | 342/357.62 |
| 6,025,795 A * | 2/2000 | Hulderman et al. | ........... | 342/45 |
| 6,061,562 A * | 5/2000 | Martin et al. | .................. | 455/431 |
| 6,157,621 A * | 12/2000 | Brown et al. | .................. | 370/310 |
| 6,388,606 B1 * | 5/2002 | Keydel et al. | ............... | 342/25 R |
| 6,448,925 B1 | 9/2002 | Shridhara | | |
| 6,708,029 B2 | 3/2004 | Wesel | | |
| 6,710,739 B1 * | 3/2004 | Loegering | ................ | 342/357.31 |
| 6,781,968 B1 * | 8/2004 | Colella et al. | ................. | 370/316 |
| 7,020,462 B1 * | 3/2006 | Wesel | ........................... | 455/427 |
| 7,680,516 B2 | 3/2010 | Lovberg et al. | | |
| 7,991,353 B2 * | 8/2011 | Moore, III | .................... | 455/13.2 |
| 2005/0017919 A1 * | 1/2005 | Sievenpiper et al. | ......... | 343/909 |
| 2005/0143005 A1 * | 6/2005 | Moore, III | .................. | 455/13.1 |
| 2008/0064328 A1 * | 3/2008 | Wesel | .......................... | 455/13.3 |

(Continued)

OTHER PUBLICATIONS

Performance Characteristics 60 GHz Communication Systems, Terabeam Corporation, Oct. 2002.

(Continued)

*Primary Examiner* — Tan Trinh

(74) *Attorney, Agent, or Firm* — John A. Miller; Miller IP Group, PLC

(57) ABSTRACT

A method for protecting communications between an aircraft and a spacecraft in outer space including flying the aircraft in the earth's atmosphere at an altitude above 40,000 feet from the earth, and preferably above 50,000 feet, and transmitting a signal from the aircraft to the spacecraft having a frequency within a range of 50-70 GHz. The method includes selecting the frequency of the signal based on the altitude of the aircraft and the elevation angle between the spacecraft the aircraft.

18 Claims, 2 Drawing Sheets

(56) References Cited

U.S. PATENT DOCUMENTS

| | | |
|---|---|---|
| 2008/0144815 A1 | 6/2008 | Richards et al. |
| 2008/0182513 A1 | 7/2008 | Hassan et al. |
| 2009/0053995 A1* | 2/2009 | Moore, III ............ 455/13.1 |
| 2009/0061795 A1 | 3/2009 | Doan et al. |
| 2010/0046455 A1 | 2/2010 | Wentink et al. |
| 2011/0218734 A1* | 9/2011 | Solheim ............ 702/3 |
| 2012/0178363 A1* | 7/2012 | Moore, III ............ 455/13.2 |

OTHER PUBLICATIONS

M. Liber, F. Baron, 60 GHz communications, technology and applications trends, Annals of Telecommunications, vol. 47, Nos. 11-12, pp. 530-532, Nov./Dec. 1992.

E. Damosso, L. Stola, G. Brussaard, Characterisation of the 50-70 GHz band for space communicatons, ESA Journal, vol. 7, No. 1, Abstract, 1983.

* cited by examiner

METHOD AND APPARATUS FOR PROTECTED COMMUNICATIONS TO HIGH ALTITUDE AIRCRAFT

BACKGROUND

1. Field of the Invention

This invention relates generally to a system and method for providing communications signals between airborne platforms and spacecraft that are protected from jamming signals and, more particularly, to a system and method for providing communications signals between aircraft and spacecraft, where the signals operate at or around 60 GHz, and where the aircraft is flying above 40,000 feet so that the signals transmitted from the aircraft to the spacecraft are prevented from being jammed by a jamming signal originating from the ground and the signals from both the aircraft and the spacecraft are prevented from being intercepted from the ground.

2. Discussion of the Related Art

Many applications, both commercial and military, use communications signals transmitted between a spacecraft, such as an earth orbiting satellite, and an aircraft or ground station. For example, high altitude long endurance (HALE) aircraft, such as several of the military's unmanned aerial vehicles (UAV), typically communicate using transponder satellite channels provided on various spacecraft using the Ka frequency band (20-30 GHz), Ku frequency band (12-15 GHz), L frequency band (1-2 GHz) and other similar frequency bands. These frequency bands are typically selected because they are often internationally allocated bands for satellite communications and they allow relatively small antennas because of their relatively short wavelengths.

Various UAVs operate with different altitudes, ranges and capabilities. While tactical UAVs nominally operate within line-of-sight of their launch and control stations, strategic reconnaissance and strike platforms typically operate beyond line-of-sight and rely on relay links to maintain mission connectivity. In addition to organic intelligence, data gathering and strike roles, UAVs are now being pressed into relay roles that extend communications to greater distances or beyond terrain blockages to traditional forces and even to other unmanned systems. Satellite communications signals provide tremendous reach and coverage for UAVs in areas denied to ground forces, but such communications often result in increased vulnerability, where the greater the distance or broader the communications area, the greater the potential exposure to counter measures, such as signal jamming.

Communication signals for these and other applications, typically military applications, are generally highly susceptible to jamming signals from the ground. Because the antennas used by a spacecraft to transmit signals to an aircraft or the ground typically have a very large footprint on the ground, sometimes on the order of hundreds of miles, unsophisticated transmitters that transmit at the frequency of the satellite signals can be placed anywhere in that footprint, and when directed towards the satellite can prevent the satellite from acceptably receiving signals from the aircraft or the ground if the intensity of jamming signal is large enough. In other words, because the signals from the aircraft are transmitted upwards towards the spacecraft, a jamming transmitter on the ground that would be behind the aircraft and in the footprint of the satellite antenna could prevent the spacecraft from receiving the signals from the aircraft. This occurs because the spacecraft is unable to distinguish the aircraft from other transmission points on the ground.

Various techniques are known in the art for minimizing or eliminating jamming signals. However, such techniques often have undesirable consequences and limitations. For example, it is known to provide frequency hopping or spread spectrum transmitters that change their transmission frequency in an attempt to operate at frequencies other than the frequency of the jamming signal. However, the jam-resistance of these spread spectrum techniques is inversely related to the bandwidth of the signal, where the wider the transmission bandwidth, the less effective the spectrum spreading becomes. Further, as communications between aircraft and spacecraft require more bandwidth, possibly on the order of 100 mega bits per second, the limitations of spread spectrum transmitters increases. It is also known in the art to use nulling antennas where the antenna gain pattern of the transmitter is designed to have a null (no gain) in the direction that the jamming signal may be originating from. However, if the intended transmitter of signals to the spacecraft is proximate to or in-line with the jamming location, then it will also not receive the transmitted signal.

Furthermore, signals transmitted from either the aircraft or the spacecraft are subject to detection by sensitive equipment on the ground. Intercept of these signals may permit evaluation of aircraft or spacecraft operations and potentially expose sensitive information.

It is known in the art that signals at or around 60 GHz are readily absorbed in the atmosphere. Particularly, oxygen molecules ($O_2$) in the air have electron orbits including resonant frequencies at or around 60 GHz that cause radiation at 60 GHz to be readily absorbed in the atmosphere. This absorption is so great that very high powered signals in this frequency band are only able to travel a short distance through the air. Thus, a spacecraft that is operable to receive signals at 60 GHz will not see such transmission signals from the ground because those signals will be absorbed by the atmosphere well before they reach outer space.

Based on this phenomenon, it is also known in the art to use the 60 GHz frequency band for communications signals transmitted between spacecraft for various applications because those signals will not be absorbed where the atmosphere is not present. Thus, these signals transmitted in space are not susceptible to jamming signals from the ground or are not intercepted by ground stations. Thus, although the electronics necessary to transmit and receive signals at this high of a frequency band are typically complex, such systems are sometimes desirable because of their anti-jamming capabilities.

DETAILED DESCRIPTION OF THE EMBODIMENTS

The following discussion of the embodiments in the invention directed to a system and method for providing jamming protection for communications signals transmitted between aircraft and spacecraft is merely exemplary in nature, and is in no way intended to limit the invention or its applications or uses.

As discussed above, it is known in the art to provide spacecraft to spacecraft communications using signals at or around 60 GHz because they will not be absorbed by oxygen molecules in the air. It is also known that using signals at or around 60 GHz that travel through the atmosphere is generally not possible because oxygen in the air greatly absorbs the signals. It has been discovered that within certain frequency windows the attenuation of 60 GHz signals in the atmosphere is significantly reduced at an altitude above 40,000 feet from the earth and is greatly reduced above 50,000 feet. Based on this observation, the present invention proposes using communications signals in these windows at or around 60 GHz between an aircraft flying at these altitudes and a spacecraft. Thus, a communications link between an aircraft flying above 40,000 feet and a spacecraft above the earth's atmosphere using the 60 GHz frequency band will typically not be significantly attenuated by the oxygen molecules in the air because there are fewer molecules to provide the attenuation.

Further, even though a spacecraft antenna may have a large field-of-view relative to the ground, jamming signals from the ground in the 60 GHz frequency band cannot jam the aircraft transmission signals because of the attenuation provided by the air molecules closer to the ground than the aircraft. For example, it has been shown that there are frequency bands several 100 MHz wide at or around 60 GHz where signals transmitted between an aircraft flying above 40,000 feet and a spacecraft are only attenuated by a few dBs, but signals at or around 60 GHz transmitted from the ground are attenuated by many 10s of dBs.

In addition, signals transmitted by an aircraft flying above 40,000 feet or earth-orbiting spacecraft in this band cannot cause interference or be intercepted on the ground due to the same high attenuation. A link between aircraft and spacecraft in this band can therefore operate without concern for terrestrial frequency coordination or ground-based intelligence gathering.

Figure 1:
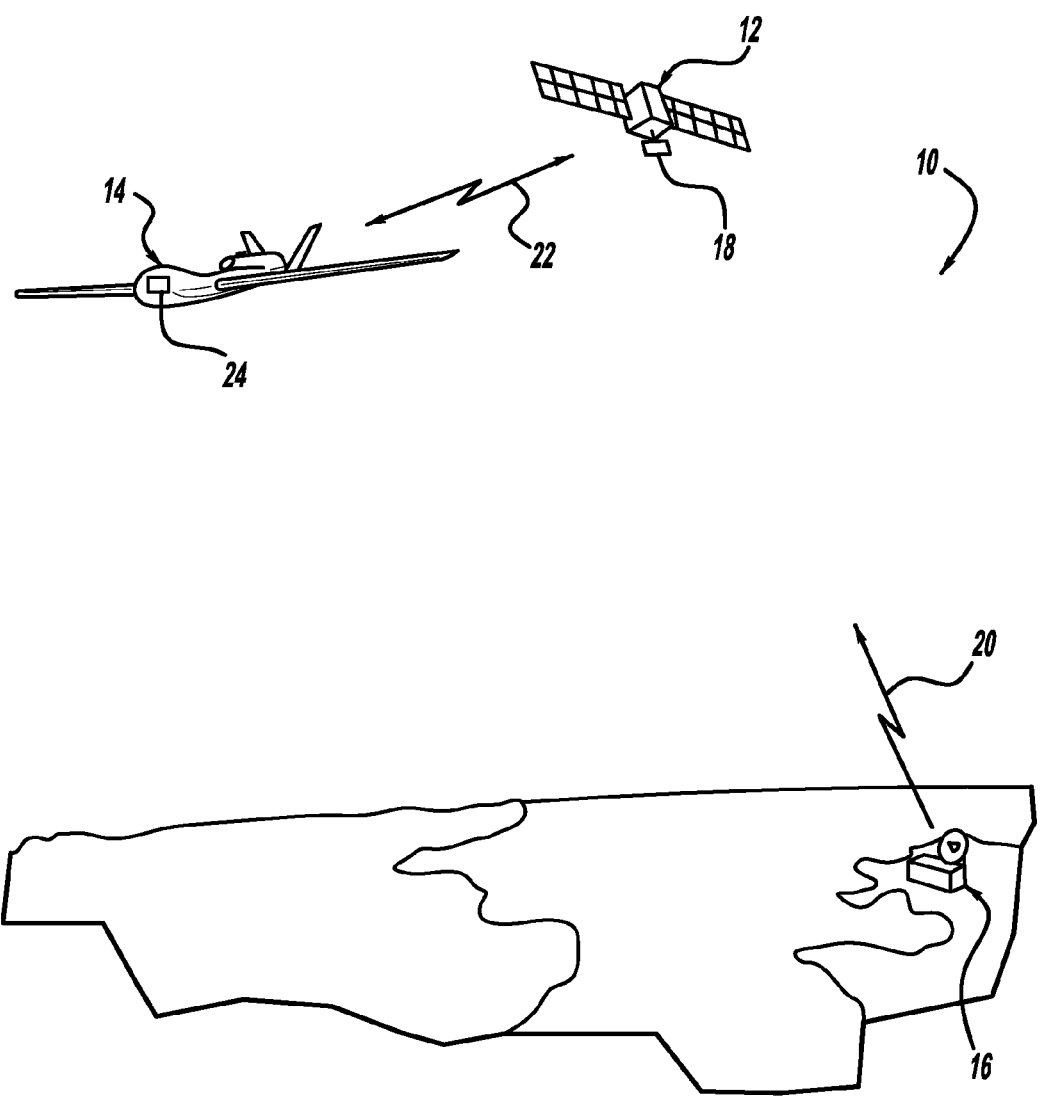
FIG. 1 is an illustration of a communications theater for signals transmitted between aircraft and spacecraft.

FIG. 1 is an illustration of a communications theater 10 including a spacecraft or satellite 12 in earth orbit, an aircraft 14, such as an UAV, flying above 40,000 feet from the ground, and preferably above 50,000 feet, in the earth's atmosphere and a ground station 16 providing a potential jamming signal 20. As discussed herein, a spacecraft or satellite would be those vehicles that operate above the earth's atmosphere, sometimes referred to as outer space, and an aircraft would obviously be flying in the earth's atmosphere generally below about 100,000 feet. The satellite 12 includes a transceiver 18 that may communicate with a transceiver 24 on the aircraft 14 using signals 22 to provide command and control messages, or other information, where the signals 22 are at or around 60 GHz. The signals 22 transmitted by the satellite 12 may be relayed from another satellite (not shown) or from another ground station (not shown). The jamming signal 20 from the ground station 16 would not be able to jam the signals 22 from the satellite 12 even if the ground station 16 is in the satellite's footprint because of the attenuation and loss of the signal 20 in the atmosphere.

Figure 2:
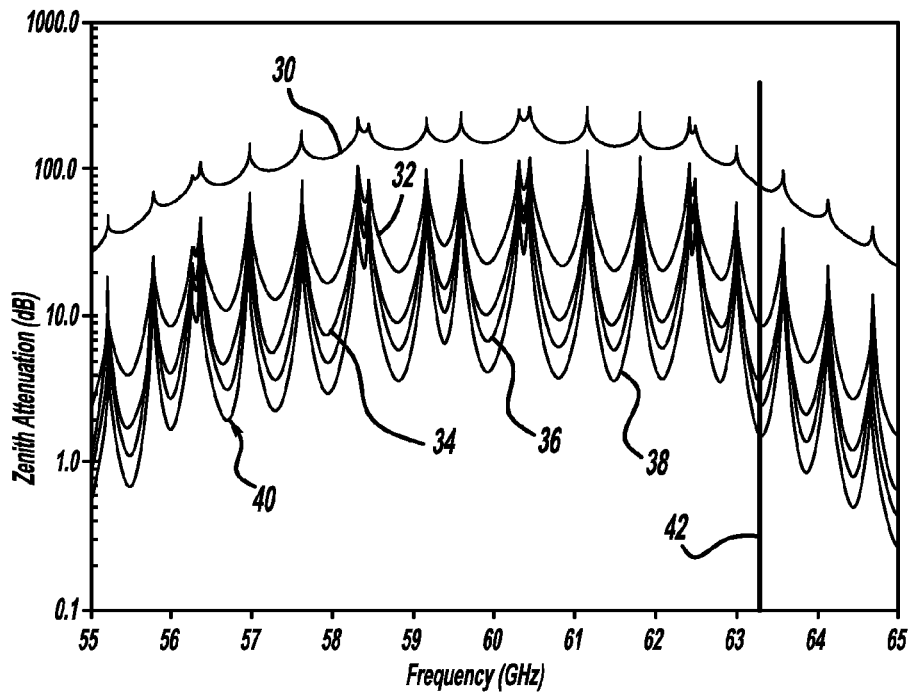
FIG. 2 is graph showing absorption of signals at or around 60 GHz at different altitudes above the earth and at 90° elevation.

FIG. 2 is a graph with frequency on the horizontal axis between 55 and 65 GHz and attenuation in dBs on the vertical axis in a log-log scale. Graph line 30 shows the attenuation of a signal transmitted from the ground to space directly up, i.e., 90° elevation, through the atmosphere over this frequency band. Further, graph line 32 shows the attenuation of a signal transmitted from 40,000 feet to space over this frequency band, graph line 34 shows the attenuation of a signal transmitted from 50,000 feet to space over this frequency band, graph line 36 shows the attenuation of a signal transmitted from 55,000 feet to space over this frequency band, and graph line 38 shows the attenuation of a signal transmitted from 60,000 feet to space over this frequency band. As is apparent, the higher up in the atmosphere that the source of the signal is, the less the signal is attenuated, where lobes 40 identify specific frequency bands in the megahertz range where the attenuation is further reduced at the particular frequency. Further, the greatest attenuation is at 60 GHz, where the attenuation is reduced as the frequency moves away from 60 GHz.

The lobes 40 in the graph lines 30-38 represent transmission windows that are about 300-500 MHz wide, making them workable bandwidths for high data rate communications. By selecting the center frequency of the signal being transmitted to be in one of the lobes 40, the attenuation of that signal is significantly reduced, but the ability that the signal can be jammed from the ground is still very high, and practically impossible. For example, it is apparent that at a frequency of about 63.5 GHz, represented by line 42, the attenuation of a signal from the ground is immense while the attenuation of a signal from a high altitude to space is only a few dBs. Thus, depending on what altitude the aircraft 14 is flying may determine which frequency the signal is centered at for a particular application, where, for example, the frequency band used for aircraft flying at about 40,000 feet may be different than the frequency band that would be used at about 60,000 feet.

As mentioned above, the graph in FIG. 2 shows the attenuation of signals transmitted in the frequency range of 55-65 GHz. However, as well be appreciated by those skilled in the art, the band of frequencies around 60 GHz that may be applicable for the signals discussed herein to prevent jamming and reception of the signals by and from ground based stations may include frequencies outside of this range, such as in the band of 50-70 GHz.

The graph lines in FIG. 2 show the various attenuations if the spacecraft 12 is directly above the aircraft 14, i.e., at an elevation of 90°. However, that will typically not be case, where the spacecraft 12 will be at some angle relative to the aircraft 14 that is less than 90°. In those situations, the signals will be transmitted through more of the earth's atmosphere, and thus, the attenuation will increase.

Figure 3:
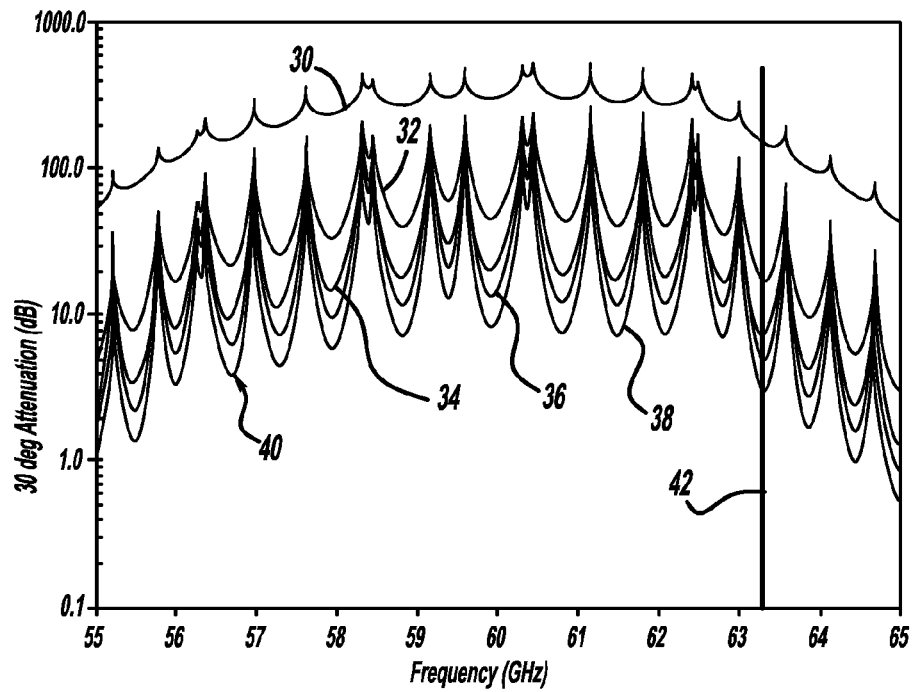
FIG. 3 is another graph showing absorption of signals at or around 60 GHz at different altitudes above the earth and at 30° elevation.

FIG. 3 is the graph shown in FIG. 2 where the elevation angle between the aircraft 14 and the spacecraft 12 is 30°, and where the same graph lines are identified by the same reference number. As is apparent, the attenuation of each of the graph lines 30-38 increases, but the higher altitudes still provide a workable attenuation of only a few dB for the signal.

Based on the discussion herein, the particular communication system that is being employed by the spacecraft 12 and the aircraft 14 may change its transmission frequency depending on the altitude that the aircraft 14 is flying and the elevation angle of the transmission signals between the spacecraft 12 and the aircraft 14. For example, if the spacecraft 12 is at a lower angle to the aircraft 14, such as shown by the 30° elevation plot of FIG. 3, the aircraft 14 may switch frequencies from a frequency closer to 60 GHz to a frequency farther from 60 GHz where the attenuation is less without loss of the potential for preventing jamming of that signal. Further, as the altitude of the aircraft 14 increases, the aircraft 14 may switch frequencies from a frequency farther from 60 GHz to a frequency closer to 60 GHz without loss of signal attenuation, but with increased anti-jamming capabilities.

Further, by simply tuning farther from the 60 GHz band center, it is possible to reach nearby frequencies where the oxygen absorption effect is minimal and communications can be established between the spacecraft and the ground. This permits a link between aircraft and spacecraft to be established and tested in an interference-free environment prior to aircraft take-off and to "tune" the amount of ground-based jamming suppression needed by simply selecting an appropriate frequency. Thus, a signal at a frequency outside of the band 50-70 GHz can be used to communicate with the aircraft while it is on the ground, and then signals within the frequency band of 50-70 GHz can be used when the aircraft is flying.

The discussion herein concerns communications between aircraft and spacecraft. However, as will be appreciated by those skilled in the art, the same analysis could apply to communications between aircraft depending on their altitude and elevation angle relative to each other.

The foregoing discussion discloses and describes merely exemplary embodiments. One skilled in the art will readily recognize from such discussion, and from the accompanying drawings and claims, that various changes, modifications and variations can be made therein without departing from the spirit and scope of the disclosure as defined in the following claims.

What is claimed is:

1. A method for communicating between an aircraft and a spacecraft in outer space, said method comprising:
   flying the aircraft in earth's atmosphere at an altitude above 40,000 feet from the earth; and
   transmitting a signal from the aircraft to the spacecraft having a frequency in a range of 50-70 GHz, wherein the frequency of the signal is selected to be a frequency that is within a lobe between peaks in a plot defining attenuation of the signal in the atmosphere relative to frequency.

2. The method according to claim 1 wherein transmitting the signal in the frequency range of 50-70 GHz includes selecting the frequency of the signal based on its absorption characteristics by oxygen molecules in air.

3. The method according to claim 1 wherein transmitting the signal in the frequency range of 50-70 GHz includes selecting the frequency of the signal based on the altitude of the aircraft.

4. The method according to claim 1 wherein transmitting the signal in the frequency range of 50-70 GHz includes selecting the frequency of the signal based on an elevation angle between the spacecraft and the aircraft.

5. The method according to claim 1 wherein the aircraft is an unmanned aircraft.

6. The method according to claim 1 further comprising transmitting a signal from the aircraft to a ground station having a frequency outside of 50-70 GHz.

7. The method according to claim 1 wherein the spacecraft is a satellite orbiting the earth.

8. A method for communicating between an aircraft and a satellite in earth orbit that provides anti-jamming capabilities, said method comprising:
   flying the aircraft in earth's atmosphere at an altitude above 50,000 feet from the earth; and
   transmitting a signal from the aircraft to the satellite having a frequency in the range of 50-70 GHz, wherein transmitting the signal includes selecting the frequency of the signal based on an elevation angle between the satellite and the aircraft.

9. The method according to claim 8 wherein the signal is transmitted at a frequency that aligns with a lobe in a plot defining attenuation of the signal in the atmosphere relative to frequency at that altitude and the elevation angle.

10. The method according to claim 8 wherein transmitting the signal includes selecting the frequency of the signal based on its absorption characteristics by oxygen molecules in air.

11. The method according to claim 8 wherein transmitting the signal includes selecting the frequency of the signal based on the altitude of the aircraft.

12. The method according to claim 8 wherein the aircraft is an unmanned aircraft.

13. The method according to claim 8 further comprising transmitting a signal from the aircraft to a ground station having a frequency outside of 50-70 GHz.

14. A method for communicating between an aircraft and a spacecraft in outer space, said method comprising:
   flying the aircraft in earth's atmosphere at an altitude above 40,000 feet from the earth; and
   transmitting a signal from the aircraft to the spacecraft having a frequency in a range of 50-70 GHz, wherein transmitting the signal includes selecting the frequency of the signal depending on the altitude of the aircraft and an elevation angle between the spacecraft and the aircraft.

15. The method according to claim 14 wherein transmitting a signal includes selecting the frequency of the signal based on its absorption characteristics by oxygen molecules in air.

16. The method according to claim 14 wherein the aircraft is an unmanned aircraft.

17. The method according to claim 14 wherein the spacecraft is a satellite orbiting the earth.

18. The method according to claim 14 further comprising transmitting a signal from the aircraft to a ground station having a frequency outside of 50-70 GHz.

* * * * *